(12) United States Patent
Minari

(10) Patent No.: US 7,444,430 B2
(45) Date of Patent: Oct. 28, 2008

(54) TERMINAL APPARATUS AND CONTROL METHOD THEREOF

(75) Inventor: Makoto Minari, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 10/695,090

(22) Filed: Oct. 28, 2003

(65) Prior Publication Data
US 2004/0088399 A1 May 6, 2004

(30) Foreign Application Priority Data
Oct. 29, 2002 (JP) ............................. 2002-314930

(51) Int. Cl.
G06F 15/13 (2006.01)
(52) U.S. Cl. ...................... 709/248; 709/203; 709/245; 709/247; 717/101; 717/103
(58) Field of Classification Search ................ 709/203, 709/245, 247, 248; 717/170, 171
See application file for complete search history.

(56) References Cited

U.S. PATENT DOCUMENTS

| 5,859,969 | A | 1/1999 | Oki et al. |
| 6,408,434 | B1 * | 6/2002 | Fujiwara ..................... 717/170 |
| 6,966,058 | B2 * | 11/2005 | Earl et al. .................. 717/171 |
| 2001/0002914 | A1 | 6/2001 | Aramoto |
| 2002/0065939 | A1 * | 5/2002 | Liu ............................. 709/248 |
| 2002/0073304 | A1 * | 6/2002 | Marsh et al. .................. 713/1 |
| 2003/0221190 | A1 * | 11/2003 | Deshpande et al. ......... 717/171 |

FOREIGN PATENT DOCUMENTS

| JP | 08-190472 | 7/1996 |
| JP | 2001-222500 | 8/2001 |

* cited by examiner

Primary Examiner—Jinsong Hu
(74) Attorney, Agent, or Firm—Cowan, Liebowitz & Latman, P.C.

(57) ABSTRACT

Management information which is transmitted from another terminal apparatus or a management apparatus and contains instructions used to manage terminal apparatuses is received (S200). A process according to the corresponding instruction is executed with reference to the received management information (S210-S290). A terminal apparatus which has not received management information yet is searched for, and the management information is transferred to the found terminal apparatus (S310).

5 Claims, 8 Drawing Sheets

| APPLICATION NAME : | INSTALL | DELETE | LAUNCH | QUIT |
|---|---|---|---|---|
| COPY | ■ | ○ | ■ | ○ |
| FAX | ■ | ○ | ■ | ○ |
| PrintServer | ○ | ○ | ○ | ○ |
| MailServer | ○ | ○ | ○ | ○ |

APPLICATION MANAGEMENT WINDOW

APPLY

FIG. 3B

APPLICATION MANAGEMENT WINDOW

| APPLICATION NAME : | INSTALL | DELETE | LAUNCH | QUIT |
|---|---|---|---|---|
| COPY | ○ | ○ | ■ | ○ |
| FAX | ○ | ○ | ■ | ○ |
| PrintServer | ○ | ○ | ■ | ○ |
| MailServer | ○ | ○ | ■ | ○ |

APPLY

| APPLICATION MANAGEMENT WINDOW | | | | | — ☒ |
|---|---|---|---|---|---|
| APPARATUS NAME : | | | | | |
| APPLICATION NAME : | INSTALL | DELETE | LAUNCH | QUIT | |
| 1F - MFP1 | | | | | ▲ |
| COPY | ● | ○ | ● | ○ | |
| FAX | ● | ○ | ● | ○ | |
| 1F - MFP2 | | | | | |
| PrintServer | ○ | ○ | ● | ○ | |
| MailServer | ○ | ○ | ● | ○ | |
| 2F - MFP2 | | | | | |
| COPY | ○ | ○ | ● | ○ | |
| PrintServer | ○ | ○ | ● | ○ | |
| MailServer | ○ | ○ | ● | ○ | ▼ |

APPLY

FIG. 8

TERMINAL APPARATUS AND CONTROL METHOD THEREOF

FIELD OF THE INVENTION

The present invention relates to a terminal apparatus connected to a network, and a management technique of a system formed by a plurality of terminal apparatuses.

BACKGROUND OF THE INVENTION

With the advent of advanced networks, high-performance CPUs, large-capacity memories and external storage devices, and advanced software environments, apparatuses which are not connected to a network so far are beginning to be connected to the network. Furthermore, apparatuses which are connected to a network so far have many advanced functions, and demands have arisen for addition of programs which are to run on these apparatuses after the apparatuses are started, and version-up of these programs. Also, demands have arisen for systematic management of application programs to be installed, and installation of application programs via a network in apparatuses such as a printing apparatus, device control apparatus, and the like which have no external storage media such as a CD-ROM, floppy® disk, and the like unlike normal computers.

For example, in a conventional system, an application program is downloaded from a host computer to a terminal apparatus via a network, and is installed in the terminal apparatus (see, e.g., Japanese Patent Laid-Open No. 08-190472 (corresponding U.S. Pat. No. 5,859,969)). In another conventional system, an application program is downloaded from a download site on the Internet via a management gateway, and is installed in an apparatus (see, e.g., Japanese Patent Laid-Open No. 2001-222500 (corresponding U.S. Publication No. US-2001-002914-A1)).

Furthermore, a demand has arisen for simultaneous management and control of application programs on apparatuses connected to networks in public facilities such as government and other public offices, schools, and the like, offices and factories of companies, and the like.

However, in the aforementioned conventional system, installation of an application program via a network is made in a one-on-one manner between a management apparatus that manages application programs and a terminal apparatus as a destination of installation. If there are a plurality of terminal apparatuses on which application programs are to be installed, the installation process must be executed by connecting the management apparatus to each terminal apparatus as a destination of installation, resulting in troublesome processes and poor efficiency.

As the number of terminal apparatuses increases, the load on the installation process becomes heavier, and human errors such as installation of a wrong application program, installation failures in some terminal apparatuses, and the like are more likely to occur, resulting in inaccurate program management.

The other conventional system considers only installation of application programs, but does not consider any control for making each terminal apparatus execute delete, launch, and quit processes of application programs, setup processes of execution environments of application programs, and the like via a network. Hence, the demand for simultaneous management and control of application programs on apparatuses connected to a network is not met.

The present invention has been made in consideration of the aforementioned problems, and has as its object to provide a technique that allows efficient and accurate program management.

SUMMARY OF THE INVENTION

In order to achieve the above object, for example, a terminal apparatus of the present invention comprises the following arrangement.

That is, a terminal apparatus in a system which is formed by a management apparatus and a plurality of terminal apparatuses connected to a network, comprising:

reception means for receiving management information which is transmitted from another terminal apparatus or the management apparatus, and contains instructions used to manage the plurality of terminal apparatuses;

processing means for executing a process according to a corresponding instruction with reference to the received management information;

search means for searching the plurality of terminal apparatuses for a terminal apparatus which has not received the management information yet; and transfer means for transferring the management information to the terminal apparatus detected by the search means.

In order to achieve the above object, for example, a management system of the present invention comprises the following arrangement.

That is, a management system which is formed by a plurality of terminal apparatuses connected to a network, and a management apparatus which can make data communications with the plurality of terminal apparatuses and manages the plurality of terminal apparatuses, the management apparatus comprising:

input means for inputting instructions for one of the plurality of terminal apparatuses;

generation means for generating management information that contains the input instructions on the basis of the input instructions;

specifying means for specifying one of the plurality of terminal apparatuses as a transmission destination of the management information; and transmission means for transmitting the management information to the specified one terminal apparatus, and each terminal apparatus comprising:

reception means for receiving management information which is transmitted from another terminal apparatus or the management apparatus, and contains instructions used to manage the plurality of terminal apparatuses;

processing means for executing a process according to a corresponding instruction with reference to the received management information;

search means for searching the plurality of terminal apparatuses for a terminal apparatus which has not received the management information yet; and transfer means for transferring the management information to the terminal apparatus detected by the search means.

In order to achieve the above object, for example, a method of controlling a terminal apparatus of the present invention comprises the following arrangement.

That is, a method of controlling a terminal apparatus in a system which is formed by a management apparatus and a plurality of terminal apparatuses connected to a network, comprising:

a reception step of receiving management information which is transmitted from another terminal apparatus or the management apparatus, and contains instructions used to manage the plurality of terminal apparatuses;

a processing step of executing a process according to a corresponding instruction with reference to the received management information;

a search step of searching the plurality of terminal apparatuses for a terminal apparatus which has not received the management information yet; and a transfer step of transferring the management information to the terminal apparatus detected in the search step.

In order to achieve the above object, for example, a terminal apparatus of the present invention comprises the following arrangement.

That is, a terminal apparatus in a system which is formed by a management apparatus and a plurality of terminal apparatuses connected to a network, comprising:

reception means for receiving management information which is transmitted from another apparatus via a network, and contains terminal information indicating a target terminal apparatus and processing information indicating processing contents;

processing means for executing a process corresponding to the processing information which is contained in the management information and indicates the processing contents;

appending means for appending completion information indicating completion of the process in the apparatus to the management information; and transmission means for transmitting the management information appended with the completion information to another terminal apparatus indicated by the terminal information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Note that a description of well-known operations and functions of those of a program management apparatus, terminal apparatus to be managed, and the like will be omitted as needed.

Figure 1:
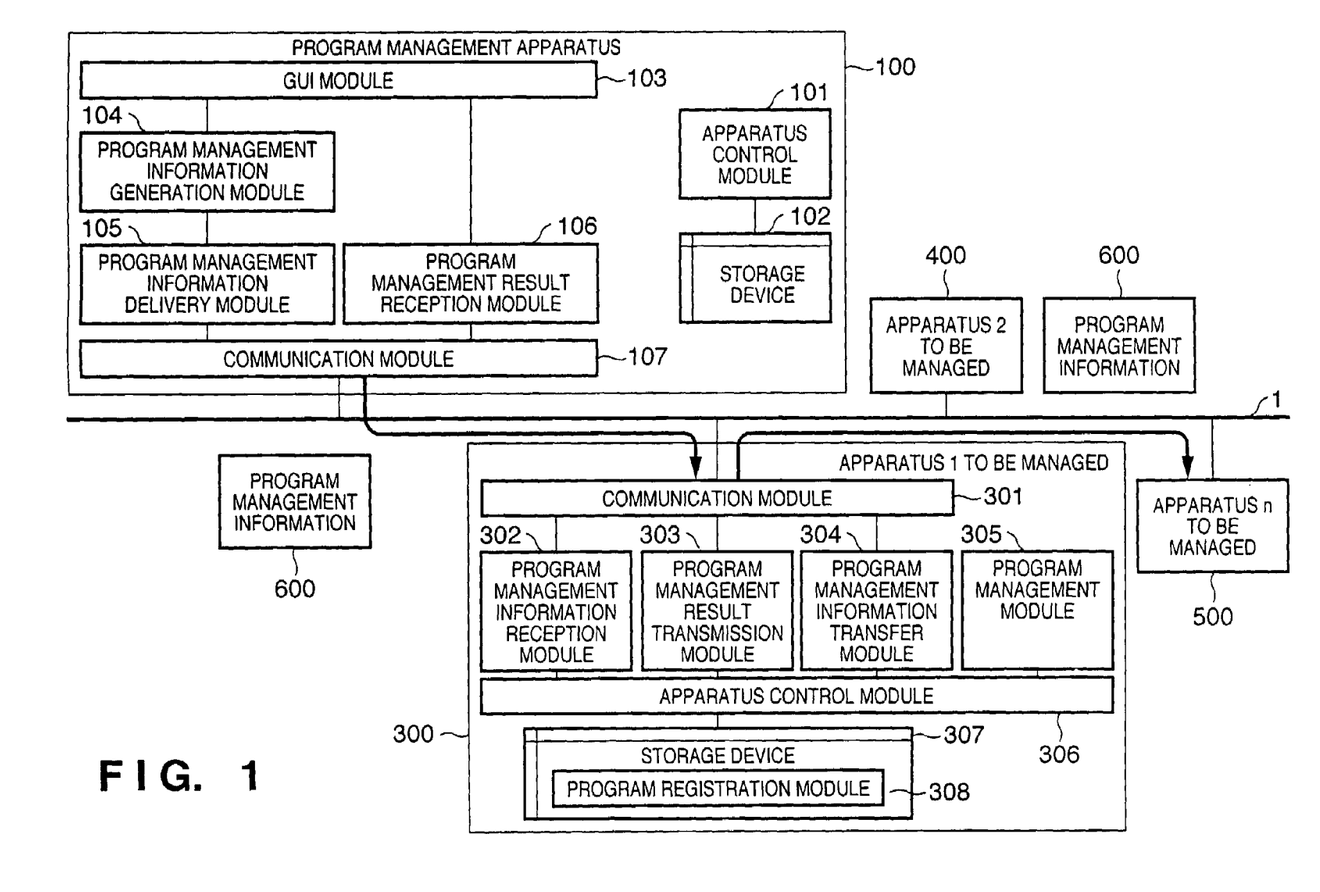
FIG. 1 is a block diagram showing the functional arrangement of a program management system according to the first embodiment of the present invention.

FIG. 1 is a block diagram showing the functional arrangement of a program management system of this embodiment. A program management apparatus 100 and a plurality of apparatus s to be managed (terminal apparatuses) 300, 400, and 500 are connected to a network 1.

In this embodiment, the number of terminal apparatuses to be managed by the program management apparatus 100 is three, as shown in FIG. 1, and the program management apparatus 100 transmits program management information (to be described later) used to make program management for the three terminal apparatuses to the terminal apparatus 300. Note that the program management information may be transmitted to other terminal apparatuses. Also, the number of terminal apparatuses is not limited to three. The terminal apparatus 300 executes a process with reference to and according to the received program management information. Upon completion of the process, the terminal apparatus 300 transmits the program management information to another terminal apparatus (terminal apparatus 400 or 500 in FIG. 1). The other terminal apparatus also executes a process with reference to and according to the received program management information. In this manner, the program management system of this embodiment collectively executes program management for all the terminal apparatuses.

The program management system of this embodiment which has the above arrangement and makes the above operations will be described in more detail below.

Reference numeral 100 denotes a program management apparatus which comprises the following arrangement. That is, the program management apparatus comprises an apparatus control module 101 which controls the overall program management apparatus, a storage device 102 used to store an operating system, programs to be executed by the program management apparatus 100, programs to be delivered to the respective terminal apparatuses to be managed, and the like, a GUI (graphical user interface) module 103 used to input instructions to the respective terminal apparatuses to be managed, a program management information generation module 104 which generates program management information that contains the type of program management, programs to be sent to the respective terminal apparatuses to be managed, identification names of programs, and the like in accordance with the instructions input via the GUI module 103, a program management information delivery module 105 which delivers the generated program management information to one of the terminal apparatuses to be managed, a program management result reception module 106 which receives results from the terminal apparatuses to be managed, and a communication module 107 which serves as an interface with the network 1. Note that the aforementioned units except for the storage device 102 may be implemented by either hardware or software.

Reference numeral 300 denotes a terminal apparatus to be managed, which comprises the following arrangement. That is, the terminal apparatus 300 comprises a communication module 301 which serves as an interface with the network 1, a program management reception module 302 which receives the program management information 600, a program management result transmission module 303 which sends the program management result to the program management apparatus 100, a program management information transfer module 304 which transfers the program management information 600 to another terminal apparatus to be managed, a program management module 305 which analyzes the program management information 600 and instructs an apparatus control module 306 to execute a process according to the analysis result, the apparatus control module 306 which controls the overall terminal apparatus 300, and a storage device 307 used to store an operating system, programs to be executed by the terminal apparatus 300, data, and the like. The storage device 307 includes a program registration module 308 for storing programs transmitted from the program management unit 100. Note that the aforementioned units of the terminal apparatus 300 except for the storage device 307 may be implemented by either hardware or software. The remaining terminal apparatuses 400 and 500 have the same functional arrangement.

Figure 8:
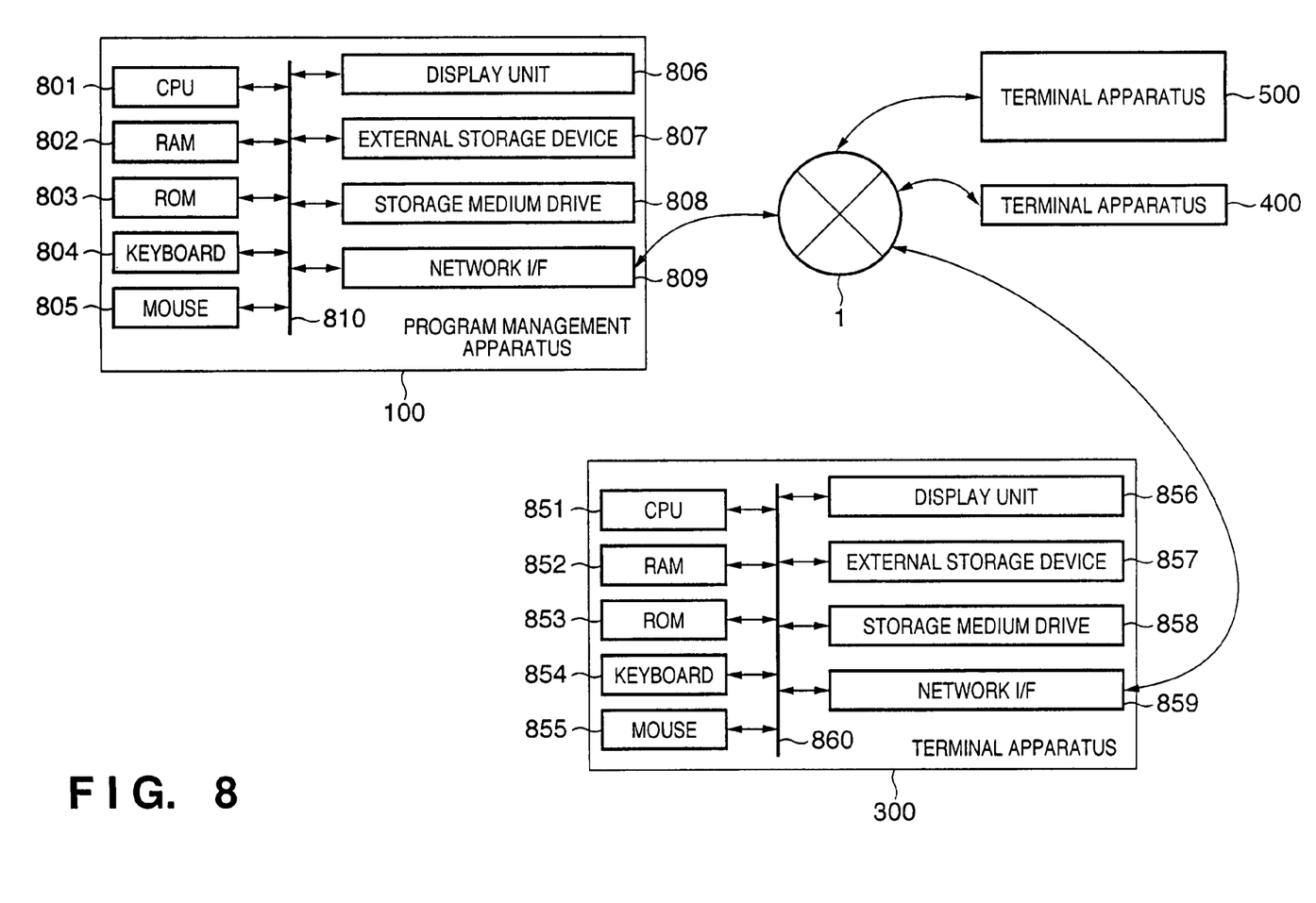
FIG. 8 is a block diagram showing the basic arrangement of the program management apparatus 100 and terminal apparatus 300.

FIG. 8 is a block diagram showing the basic arrangement of the program management apparatus 100 and terminal apparatus 300. The basic arrangement of the program management apparatus 100 will be explained first. Reference numeral 801 denotes a CPU which controls the overall program management apparatus 100 using programs and data stored in a RAM 802 and ROM 803, and executes a generation process of the program management information 600, a transmission process of the generated program management information 600 to one of the terminal apparatuses to be managed, and the like. The RAM 802 comprises an area for temporarily storing programs and data loaded from an external storage device 807 and storage medium drive 808, and also a work area used by the CPU 801 to execute respective processes.

The ROM 803 stores programs and data required to control the overall program management apparatus 100. Reference numerals 804 and 805 respectively denote a keyboard and mouse, which are used as pointing devices and serve as a user I/F for inputting various instructions to the CPU 801. Reference numeral 806 denotes a display unit which comprises a CRT, liquid crystal display, or the like, and displays various images, text information, and the like. The external storage device 807 serves as a large-capacity information storage device such as a hard disk or the like, and saves an operating system, programs required to implement a generation process of the program management information 600, a transmission process of the generated program management information 600 to one of the terminal apparatuses to be managed, and the like (also, software programs required when the units of the program management apparatus 100 shown in FIG. 1 other than the storage device 102 are implemented by software), and data.

The storage medium drive 808 reads out programs and data from a storage medium such as a CD-ROM, DVD-ROM, and the like, and outputs the readout programs and data to the RAM 802 and external storage device 807. Reference numeral 809 denotes a network I/F which is used as an I/F required to make data communications with other apparatuses (terminal apparatuses in FIG. 8) connected to the network 1. The programs and data are exchanged via the network I/F 809. Reference numeral 810 denotes a bus that interconnects the aforementioned units.

The basic arrangement of the terminal apparatus 300 will be described below. Reference numeral 851 denotes a CPU which controls the overall terminal apparatus 300 using programs and data stored in the RAM 852 and ROM 853, and executes a process according to the received program management information 600, a process for transferring the program management information 600 to another terminal apparatus, and the like. The RAM 852 comprises an area for temporarily storing programs and data loaded from an external storage device 857 and storage medium drive 858, the program management information 600 received via a network I/F 859, and the like, and also a work area used by the CPU 851 to execute respective processes.

The ROM 853 stores programs and data required to control the overall terminal apparatus 300. Reference numerals 854 and 855 respectively denote a keyboard and mouse, which are used as pointing devices and serve as a user I/F for inputting various instructions to the CPU 851. When the terminal apparatus 300 is, for example, a hybrid machine having a copy function, facsimile function, and the like, it does not comprise the keyboard 854 and mouse 855. Hence, the keyboard 854 and mouse 855 are not always required depending on the type of the terminal apparatus 300. Reference numeral 856 denotes a display unit which comprises a CRT, liquid crystal display, or the like, and displays various images, text information, and the like. The external storage device 857 serves as a large-capacity information storage device such as a hard disk or the like, and saves an oppratimg system, programs required to implement a process according to the received program management information 600, a process for transferring the program management information 600 to another terminal apparatus, and the like (also, software programs required when the units of the terminal apparatus 300 shown in FIG. 1 other than the storage device 307 are implemented by software), and data.

The storage medium drive 858 reads out programs and data from a storage medium such as a CD-ROM, DVD-ROM, and the like, and outputs the readout programs and data to the RAM 852 and external storage device 857. The network I/F 859 is used as an I/F required to make data communications with other apparatuses (terminal apparatuses in FIG. 8) connected to the network 1. The programs and data are exchanged via the network I/F 859. Reference numeral 860 denotes a bus that interconnects the aforementioned units. Note that the remaining terminal apparatuses 400 and 500 have the same arrangement.

Figure 2:
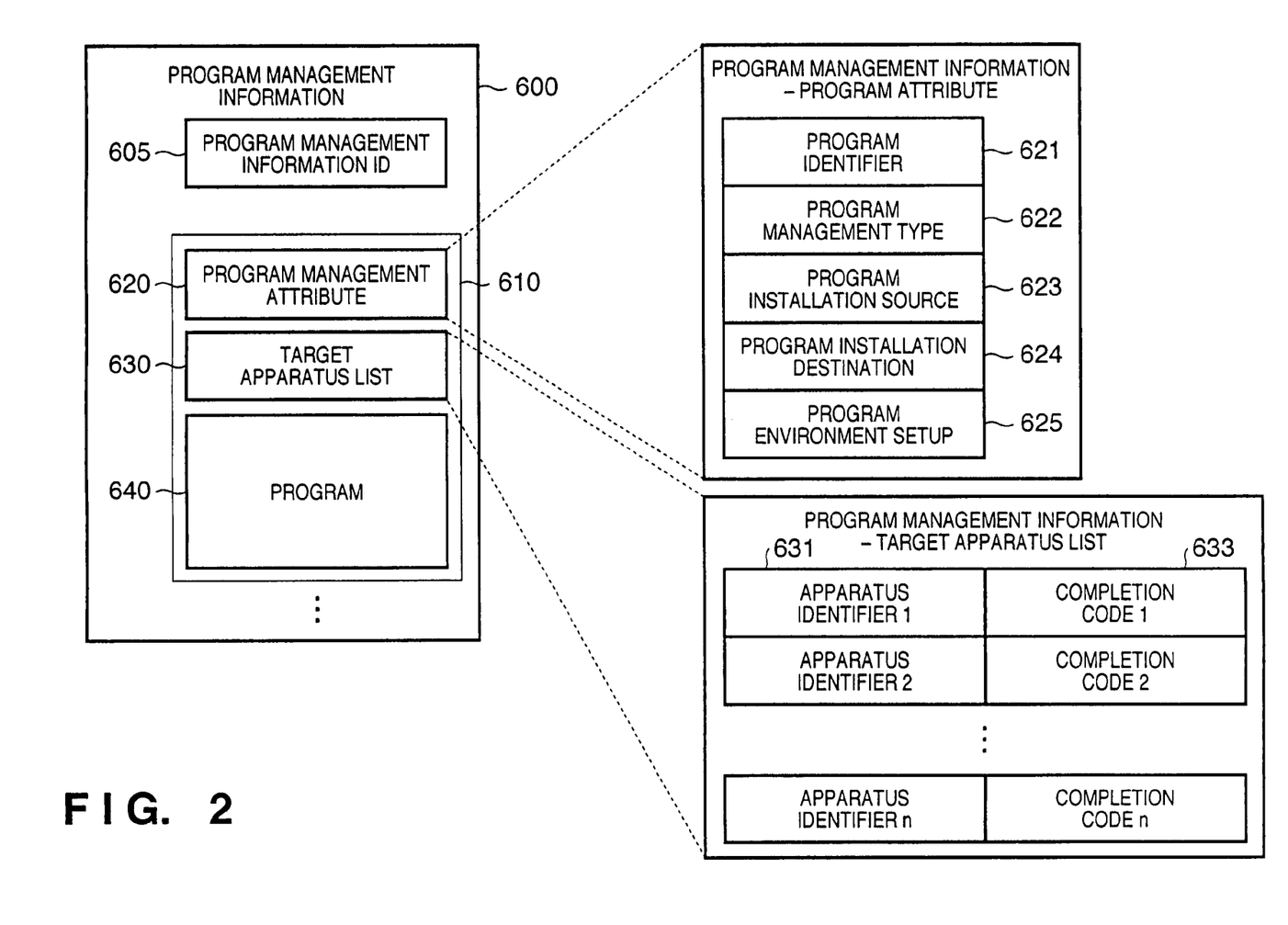
FIG. 2 shows an example of the configuration of program management information.

The program management information to be handled by the program management system formed by the program management apparatus and terminal apparatuses will be described below. FIG. 2 shows an example of the configuration of the program management information.

The program management information 600 is made up of a program management information ID 605 used to uniquely identify the program management information on the network, a program management attribute 620 which includes a program identifier required to identify each individual program that has already been installed in the terminal apparatuses to be managed, a program management type, and the like, a target apparatus list 630 which includes apparatus identifiers (which describe sets of information that can specify the terminal apparatuses on the network such as the IP addresses of the terminal apparatuses on the network 1 or the like, and the terminal names) used to identify the respective terminal apparatuses to be managed, and the like, and a program 640 to be installed on the respective terminal apparatuses to be managed (and also data as needed).

The program management information ID 605 is generated based on the IP address of the program management apparatus 100 and a time stamp which indicates the generation time of the program management information by the program management information generation module 104, and is used to uniquely identify the program management information on the network.

The program management attribute 620, target apparatus list 630, and program 640 are handled as a set of data 610, and are combined as needed. The program management information 600 may contain a plurality of sets of data.

The program management attribute 620 contains a set of a program identifier 621 required to identify each individual program that has already been installed in the terminal apparatuses to be managed, as described above, a program management type 622 that represents a program management type such as "install program", "delete program", "launch program", "quit program", "set program environment", "notify program status", or the like, a program installation source 623 as information used to specify the installation source of a program to be managed, a program installation destination 624 as information that represents the installation destination of a program to be managed or the location of a program to be deleted in the terminal apparatus, and a program environment setup 625 used to set a program environment, which are combined as needed. Note that the program installation source 623 uses, for example, the URL of the program management apparatus 100 on the network. Also, the program installation destination 624 uses, for example, a directory in each terminal apparatus.

The target apparatus list 630 contains, for each terminal apparatus, an apparatus identifier 631 used to identify each terminal apparatus to be managed, and a completion code 633 indicating whether or not the program management information 600 has been transmitted to each terminal apparatus. As for the apparatus identifiers, the operator may check terminal apparatuses connected to the network 1, and may store their identifiers in the external storage device 807 in advance, or the program management apparatus 100 may access the network 1 to search for connected terminals, and may generate the identifiers of the found terminals. In the latter case, this process may be done in advance, and the results (apparatus identifiers) may be saved in the external storage device 807, or the process may be done upon generation of the program management information. Also, a code (e.g., 0) indicating "not complete" is set in advance in all completion codes.

In the configuration of the program management information shown in FIG. 2, for example, the program installation source 623, program installation destination 624, and program 640 need not be contained in the program management information when a program is not installed in each terminal to be managed. Also, the program environment setup 625 need not be contained in the program management information when a program environment setup is not made for each terminal to be managed.

Figure 4:
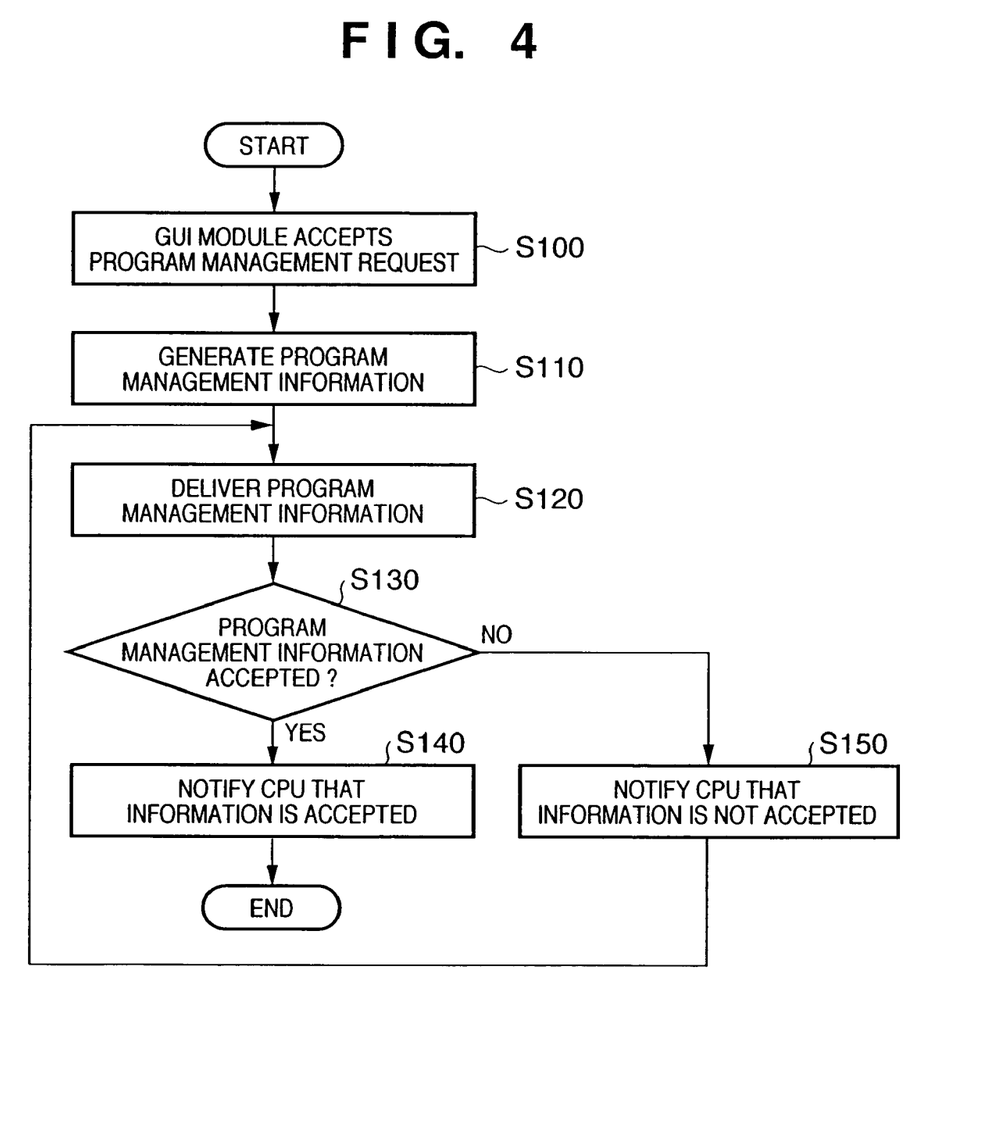
FIG. 4 is a flow chart showing the process executed when a program management apparatus 100 transmits program management information 600 to a terminal apparatus 300.
Figure 5:
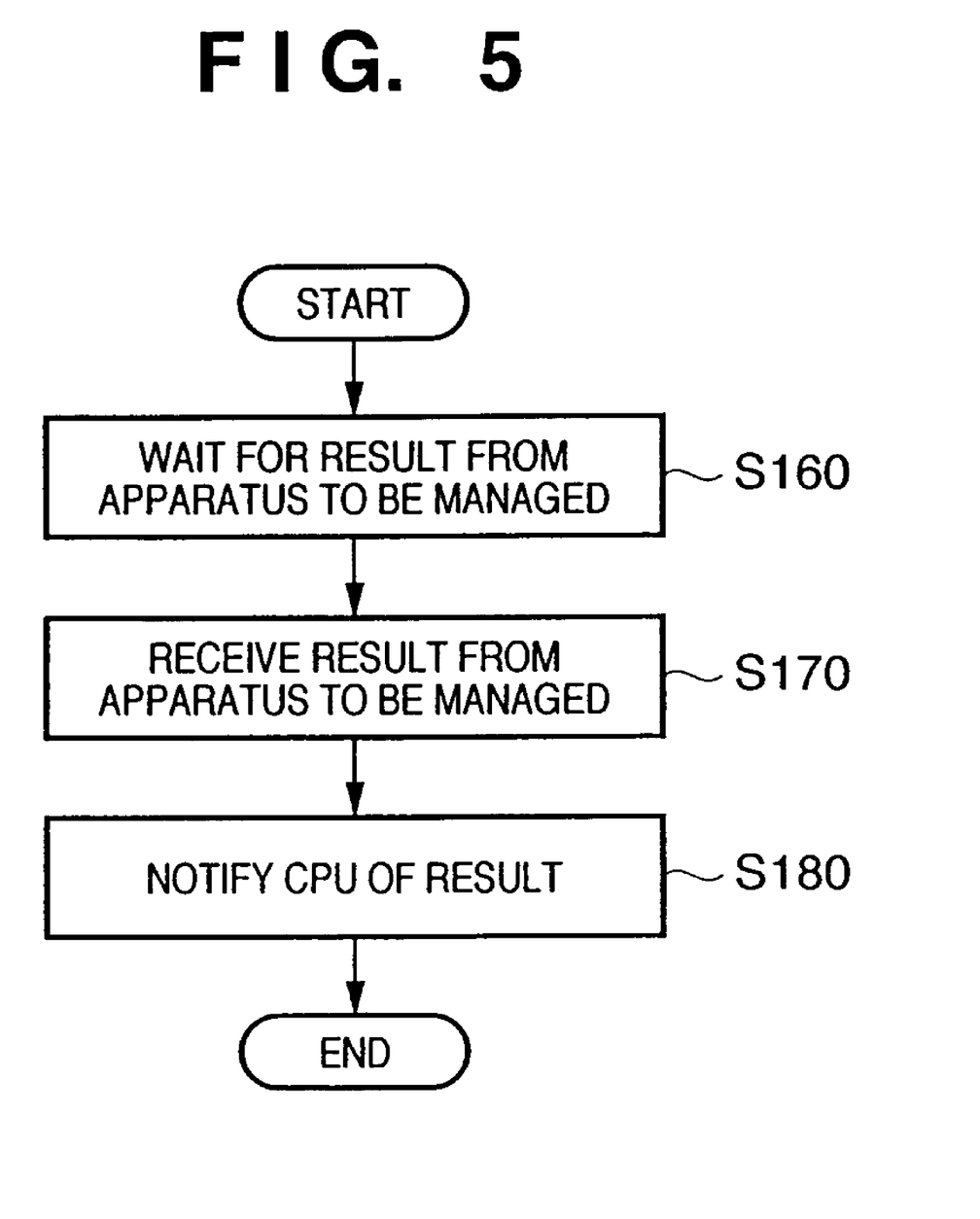
FIG. 5 is a flow chart showing the process which is executed independently of and parallel to the process according to the flow chart shown in FIG. 4 after the program management apparatus 100 transmits the program management information 600 to the terminal apparatus 300.

The process executed when the program management apparatus 100 transmits the program management information 600 to the terminal apparatus 300 in the processes to be executed by the program management system will be described below using FIGS. 4 and 5. FIG. 4 is a flow chart showing the process executed when the program management apparatus 100 transmits the program management information 600 to the terminal apparatus 300, and FIG. 5 is a flow chart showing the process which is executed independently of and parallel to the process according to the flow chart shown in FIG. 4 after the program management apparatus 100 transmits the program management information 600 to the terminal apparatus 300.

In step S100, application programs to be transmitted to the terminal apparatuses to be managed and their management attributes, which are input by the operator using the keyboard 804 and mouse 805 via a program management window (GUI module 103) displayed on the display screen of the display unit 806 of the program management apparatus 100, are accepted.

Figure 3A:
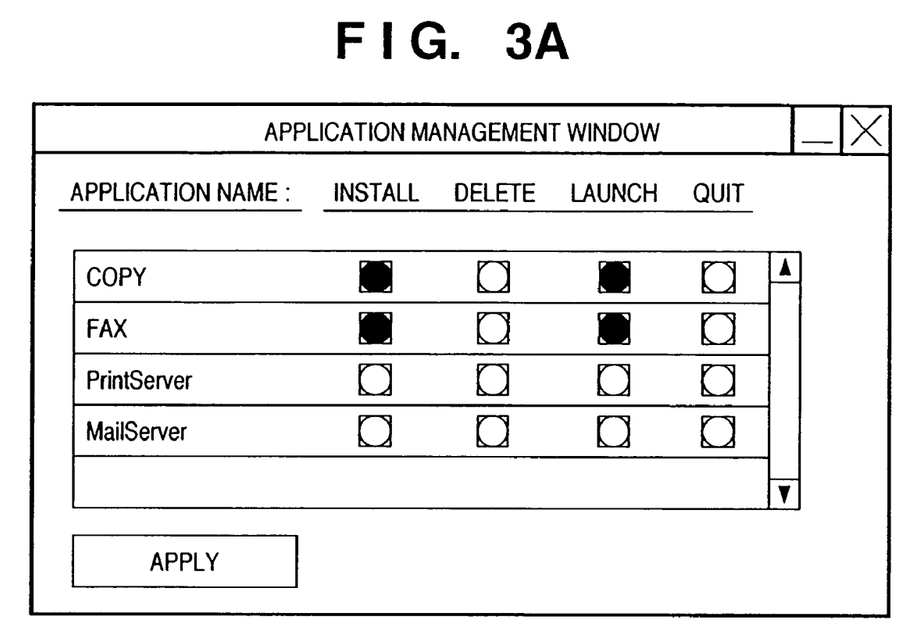
FIG. 3A shows a display example of a program management window (GUI) used to input application programs to be transmitted to a terminal apparatus to be managed and their management attributes.
Figure 3B:
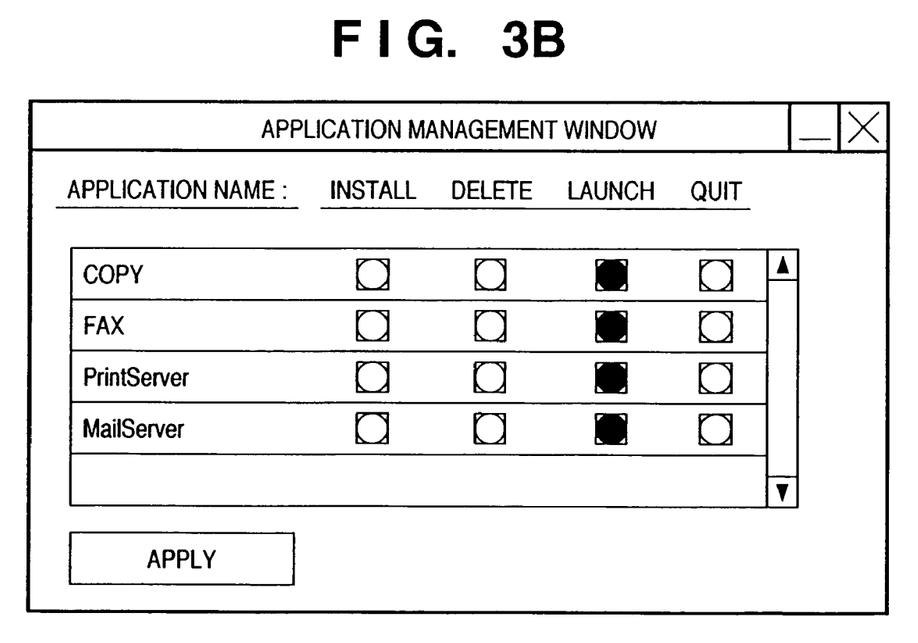
FIG. 3B shows a display example of a program management window (GUI) used to input application programs to be transmitted to a terminal apparatus to be managed and their management attributes.

FIGS. 3A and 3B show display examples of the program management window (GUI) used to input application programs to be transmitted to the terminal apparatuses to be managed and their management attributes. On the window shown in FIG. 3A, the operator has designated to "install" and "launch" applications "COPY" and "FAX". The designated items are indicated by black dots.

On the other hand, on the window shown in FIG. 3B, the operator has designated to "launch" applications "COPY", "FAX", "PrintServer", and "MailServer".

In step S110, the CPU 801 (program management information generation module 104) generates the program management information 600 which contains the program management information ID 605, program management attribute 620, target apparatus list 630, and program 640 as needed.

In step S120, the network 1 is searched for one of terminal apparatuses to be managed, and the program management information 600 is transmitted to the found terminal apparatus (the terminal apparatus 300 in this embodiment).

It is checked in step S130 if a message indicating that the terminal apparatus 300 has received the program management information 600 is transmitted from the terminal apparatus 300. Upon reception of the message indicating that the terminal apparatus 300 has received the program management information 600 from the terminal apparatus 300, the flow advances to step S140 to advise the CPU 801 accordingly.

On the other hand, if a message indicating that the terminal apparatus 300 has received the program management information 600 cannot be received from the terminal apparatus 300 within a predetermined period of time, for example, if the terminal apparatus 300 does not receive the program management information 600 due to a transmission error on the network, the flow advances to step S150 to advise the CPU 801 accordingly, and the processes in step S120 and subsequent steps are executed. Note that a message indicating that transmission of the program management information 600 has failed may be displayed on the display unit 806 to inform the operator of that error.

Upon completion of the process in step S120, processes in step S160 and subsequent steps are executed parallel to the process according to the flow chart shown in FIG. 4. In step S160, the control waits for a message indicating whether or not the process according to the program management information 600 is complete from each of the terminal apparatuses to be managed including the terminal apparatus 300. If such completion message is received in step S170, it is sent to the CPU 801 in step S180, which displays the message on the display unit 806 to advise the operator accordingly.

Figure 6:
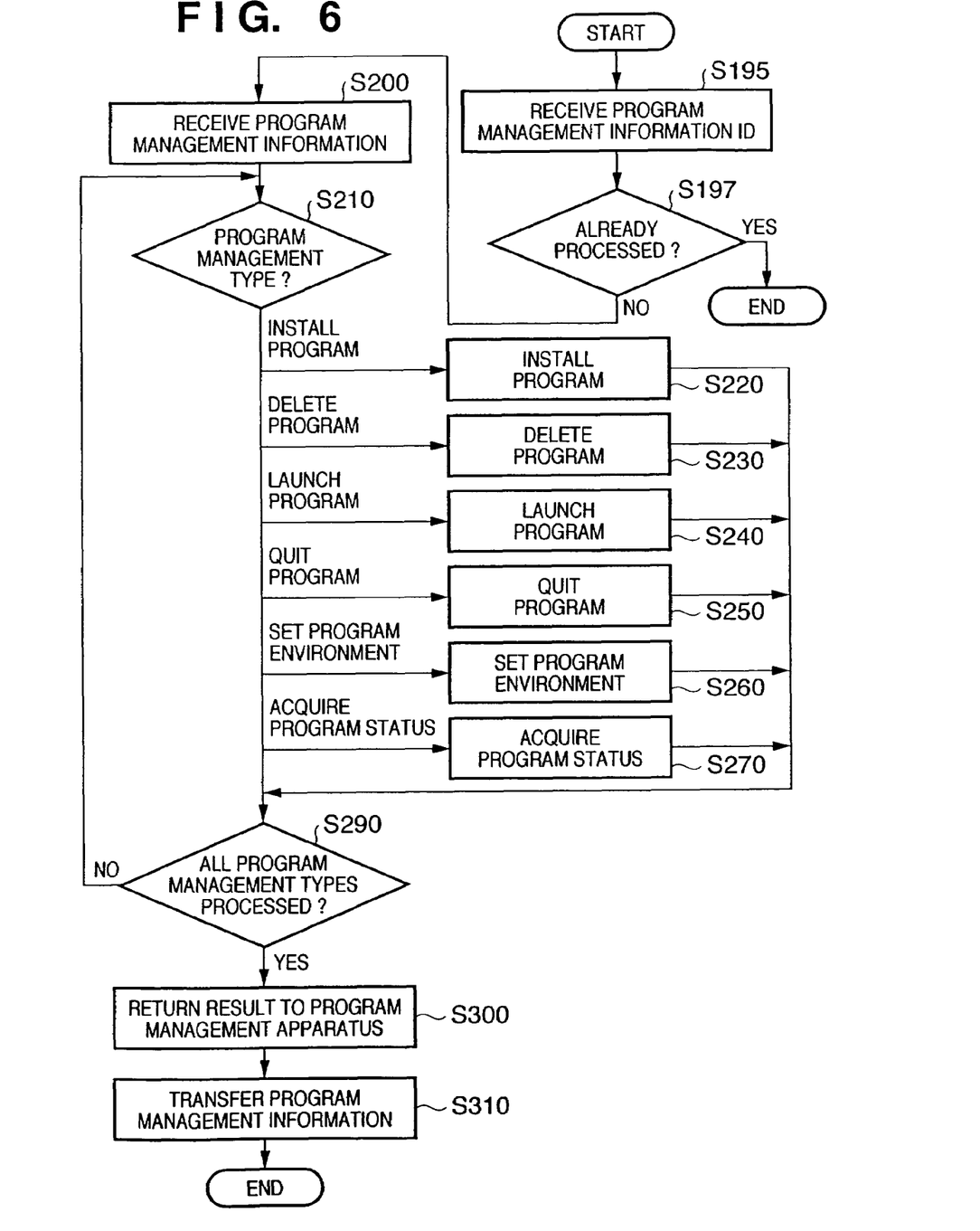
FIG. 6 is a flow chart showing the process which is executed by the terminal apparatus 300 with reference to the program management information 600 received from the program management apparatus 100.

The process to be executed by the terminal apparatus 300 will be described below. FIG. 6 is a flow chart showing the process which is executed by the terminal apparatus 300 with reference to the program management information 600 received from the program management apparatus 100.

In step S195, the CPU 851 refers to the program management ID 605 contained in the program management information 600 received via the network I/F 859. The CPU 851 checks in step S197 if the received program management information is the one which was processed previously. Since the terminal apparatus holds the ID of the program management information which was received previously (and each ID is unique to each individual program management information and is one and only), if the terminal apparatus receives new program management information, it can compare the program management information ID contained in the new program management information with the held IDs and can check if the currently received program management information is the one which was processed previously.

If it is determined that the received program management information is the one which was processed previously, the process ends; otherwise, the received program management information is accepted in step S200. That is, the received program management information is to be processed in the following steps.

The CPU 851 determines with reference to the program management type 622 in the program management attribute 620 contained in the program management information 600 in step S210 which of processes "install program", "delete program", "launch program", "quit program", "set program environment", and "notify program status" the program management apparatus 100 requests for the terminal apparatus 300 using the program management information 600.

If the program management type is "install program", the CPU 851 refers to the program installation destination 624 contained in the program management attribute 620 and installs the program (and also data as needed) 640 contained in the program management attribute 620 in, e.g., a directory of the external storage device 857 designated by the program installation destination 624 in step S220.

If the program management type is "delete program", the CPU 851 refers to the program installation destination 624 contained in the program management attribute 620 and deletes a program (and also data as needed) in, e.g., a directory of the external storage device 857 designated by the program installation destination 624 in step S230.

If the program management type is "launch program", the CPU 851 refers to the program environment setup 625 contained in the program management attribute 620 and launches a program which has already been installed in the terminal apparatus 300 or is installed in step S220 and is designated by the program environment setup 625 in step S240.

If the program management type is "quit program", the CPU 851 refers to the program environment setup 625 contained in the program management attribute 620 and quits a program which has already be n installed in the terminal apparatus 300 or has been executed and is designated by the program environment setup 625 in step S250.

If the program management type is "set program environment", the CPU 851 refers to the program environment setup 625 contained in the program management attribute 620 and makes an environment setup of a program that has already been installed in the terminal apparatus 300 in step S260.

If the program management type is "notify program status", the CPU 851 acquires the status of a program designated by the program identifier 621, and sends the result to the program management apparatus 100 in step S270.

Since a plurality of sets of data 610 can be set in the program management information 600, it is checked in step S290 if all program management types have been processed. If program management types to be processed still remain, the flow returns to step S210 to execute the subsequent processes. On the other hand, if all program management types have been processed, the CPU 851 sends a message indicating that all program management types have been processed to the program management apparatus 100 via the network I/F 859 in step S300.

Finally, the CPU 851 searches for another terminal apparatus on the network 1 in step S310. More specifically, the CPU 851 outputs the program management information ID 605 onto the network 1 by, e.g., broadcast. Another terminal apparatus which has not processed that program management information ID 605 yet returns a response, thus finding the other terminal apparatus to be managed. The CPU 851 transfers the program management information 600 to the other found terminal apparatus, and the terminal apparatus 300 ends the process. If no response is returned, this means that all terminal apparatuses to be managed on the network 1 have processed the program management information 600 delivered from the program management apparatus 100, i.e., a series of program management processes started by the program management apparatus 100 are done.

As described above, according to the program management system of this embodiment, in which the program management apparatus and a plurality of terminal apparatuses to be managed are connected via the network, when the program management apparatus transmits a program management instruction (e.g., install, launch, quit, or the like of a program) to one of the terminal apparatuses to be managed on the network without designating the terminal apparatus to be managed, the program management instruction can also be transmitted to other terminal apparatuses to be managed on the network. In this manner, the load on the operator can be reduced, and program control and management can be efficiently and accurately done.

In this embodiment, all the terminal apparatuses are controlled to execute the process according to the management information. However, the present invention is not limited to such specific process, and a terminal apparatus to be excluded from the process may be designated upon generating the management information on the program management apparatus.

Second Embodiment

In the program management system of the first embodiment, the program management information contains a program to be installed in each terminal apparatus. In a program management system of this embodiment, however, a program to be installed in each terminal apparatus is stored in an apparatus (server apparatus) which is independent of the program management apparatus and terminal apparatuses, and the address (e.g., URL) of the server apparatus is registered in the program installation source 623.

With this arrangement, upon reception of the program management information, each terminal apparatus can specify the URL of the server apparatus with reference to the program installation source contained in the program management information, and can download a program from the specified URL.

Therefore, in the functions of the program management system of this embodiment, the server apparatus is connected to the network 1 in addition to the system of the first embodiment. Hence, other functions are the same as those of the first embodiment, and a description thereof will be omitted. The program management system of this embodiment will be described below.

In this embodiment, the apparatus identifier 631 is used to explicitly designate a terminal apparatus to be managed. That is, in the first embodiment, the network is searched for a terminal apparatus to be managed, and program management information is transmitted/transferred to the found terminal apparatus. However, in this embodiment, since the apparatus identifier 631 is designated, program management information is transmitted/transferred to the terminal apparatus designated by the apparatus identifier 631 without searching the network.

The process to be executed by the program management system of this embodiment will be described below. The flow chart of the process executed when the program management apparatus 100 transmits the program management information 600 to the terminal apparatus 300 and the flow chart of the process which is executed independently of and parallel to the process according to the flow chart shown in FIG. 4 after the program management apparatus 100 transmits the program management information 600 to the terminal apparatus 300 are basically the same as those shown in FIGS. 4, and 5. A difference from the process described in the first embodiment will be explained below.

In step S100, application programs to be transmitted to the terminal apparatuses to be managed and their management attributes, which are input by the operator using the keyboard 804 and mouse 805 via a program management window (GUI module 103) displayed on the display screen of the display unit 806 of the program management apparatus 100, are accepted.

Figure 7:
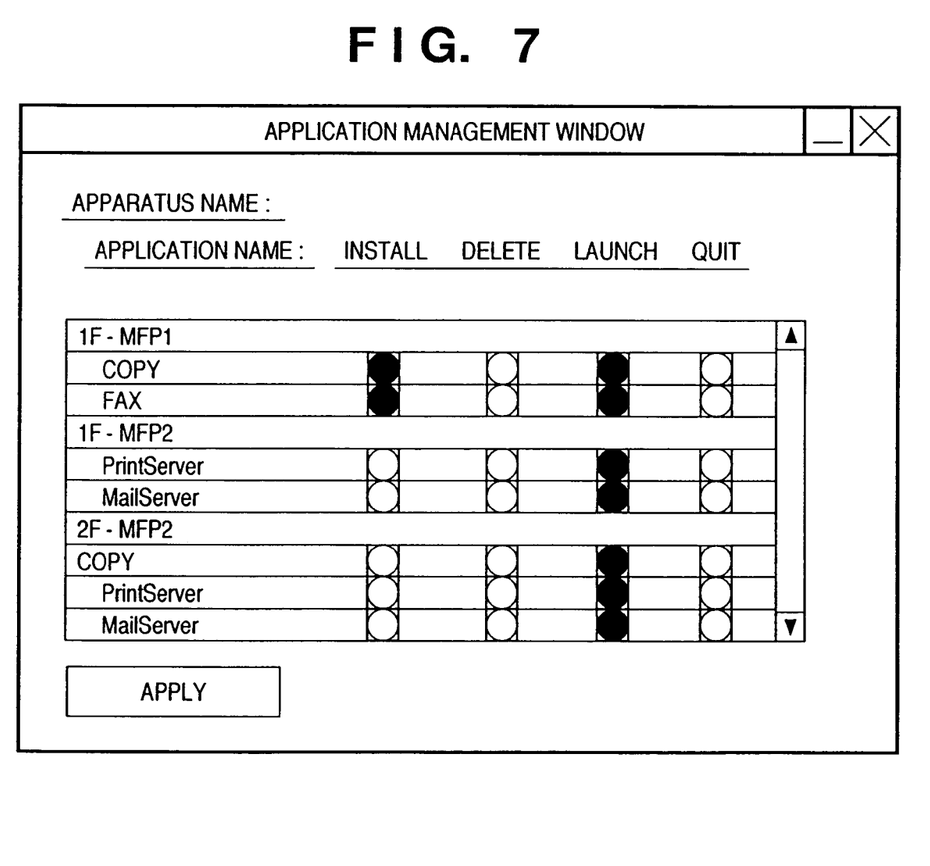
FIG. 7 shows a display example of a program management window (GUI) used to input application programs to be transmitted to a terminal apparatus to be managed and their management attributes.

FIG. 7 shows a display example of the program management window (GUI) used to input application programs to be transmitted to the terminal apparatuses to be managed and their management attributes. On the window shown in FIG. 7, the operator has designated to "install" and "launch" applications "COPY" and "FAX" on terminal apparatus "1F-MFP1" to be managed. Likewise, the operator has designated to "launch" applications "PrintServer" and "MailServer" on terminal apparatus "1F-MFP2" to be managed. Furthermore, the operator has designated to "launch" applications "COPY", "PrintServer", and "MailServer" on terminal apparatus "2F-MFP1" to be managed.

In step S110, the CPU 801 (program management information generation module 104) generates the program management information 600 which contains the program management information ID, program management attribute 620, target apparatus list 630, and program 640 as needed. In step S120, the CPU 801 (program management information delivery module 105) determines an apparatus identifier of a terminal apparatus as the first delivery destination of the program management information 600 with reference to the apparatus identifier 631.

In this case, for example, a terminal apparatus at the top of the list of terminal apparatus names stored in the apparatus identifier 631 is selected as the first delivery destination. However, the present invention is not limited to this. For example, the terminal apparatus may be selected in arbitrary orders such as an alphabetical order, descending order of the number of programs to be installed, and the like. In FIG. 7, since "1F-MFP1" appears at the top of the list, the program management information 600 is delivered to "1F-MFP1" first. The terminal apparatus which received the program management information 600 executes basically the same process as in the terminal apparatus of the first embodiment.

If the process in the terminal apparatus is complete, in step S310, the CPU 851 (program management information transfer module 304) sets a code indicating that the process is complete in the completion code 632 corresponding to this terminal apparatus, and transmits the program management information 600 to a terminal apparatus which has not completed the process yet.

Assuming that the terminal apparatus that received the program management information 600 is the terminal apparatus 300, the process to be executed by the terminal apparatus 300 of this embodiment will be described below. The flow chart of the process to be executed by the terminal apparatus 300 of this embodiment is basically the same as that shown in FIG. 6 in the first embodiment, except for a process to be executed if it is determined in step S210 that the program management type in the received program management information 600 for the terminal apparatus 300 is "install program".

In step S220, the CPU 851 specifies the address of the server apparatus on the network with reference to the URL designated by the program installation source 623 contained in the program management attribute 620, downloads a program from the specified address of the server apparatus, and installs the downloaded program in a directory designated by the program installation destination 624.

As described above, according to the program management system of this embodiment, in which the program management apparatus and a plurality of terminal apparatuses to be managed are connected via the network, the program management apparatus can explicitly designate a terminal apparatus to be managed. By inputting an instruction once, a program management instruction (e.g., install, launch, quit, or the like of a program) can be delivered to one terminal apparatus to be managed on the network, and that program management instruction can also be delivered to other terminal apparatuses to be managed on the network. In this way, since program management is automatically executed on each terminal apparatus, the load on the operator can be reduced, and program control and management can be efficiently and collectively executed without increasing network traffic. Furthermore, since the URL can be designated as the program installation source, and the server apparatus independent of the program management apparatus is used to save programs, the load on the process to be executed by the program management apparatus can be reduced.

Another Embodiment

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

The storage medium includes a communication medium such as a communication cable used in a network such as the Internet, LAN, or the like. That is, when the program code of the aforementioned embodiment is held in a server apparatus on the network, a program can be installed in a computer by downloading the program from the server apparatus to the computer via the network. Hence, the installed program is executed by a control circuit such as a CPU, MPU, or the like on the computer, and the computer can consequently implement the functions of the aforementioned embodiment. Therefore, the aforementioned storage medium includes a communication medium such as a communication cable or the like used in the network.

As described above, according to the present invention, program management can be efficiently and accurately executed.

As many apparently widely different embodiments of the present invention can be made without departing from the spirit and scope thereof, it is to be understood that the invention is not limited to the specific embodiments thereof except as defined in the claims.

What is claimed is:

1. A terminal apparatus connected to a network to which a management apparatus is connected, the terminal apparatus comprising:

reception means for receiving an instruction which is transmitted from the management apparatus or another terminal apparatus connected to the network;

storage means for storing identifications of instructions received in the past by said reception means;

determination means for determining whether or not an instruction newly received by said reception means is the same as any one of instructions have been already received in the past, using an identification of the newly received instruction and the identifications stored in said storage means;

installation means for, if the newly received instruction is a program install instruction and is different from each of instructions have been already received in the past, downloading a program designated by the newly received instruction from a server designated by the newly received instruction, and installing the downloaded program;

execution means for, if the newly received instruction is a program execution instruction and is different from each of instructions have been already received in the past, executing a program designated by the newly received instruction;

quitting means for, if the newly received instruction is a program execution quit instruction and is different from each of instructions have been already received in the past, quitting a program which has been executed and is designated by the newly received instruction;

informing means for informing the management apparatus about the installation if said installation means installs the downloaded program, and about the execution if said execution means executes the program designated by the newly received instruction;

search means for searching for a second terminal apparatus which is connected to the network and has not received the newly received instruction; and transfer means for transferring the newly received instruction to the second terminal apparatus, wherein if the newly received instruction includes both the program install instruction and the program execution instruction and is different from each of instructions have been already received in the past, said installation means downloads a program designated by the newly received instruction from a server designated by the newly received instruction, and installs the downloaded program, and said execution means executes the program, which is designated by the newly received instruction and is installed by said installation means.

2. The apparatus according to claim 1, wherein said reception means further receives instruction for instructing at least one of a delete process of a program which is held in advance, an environment setup process of a program which is held in advance, and a process for acquiring status of a program which is held in advance and sending the acquired status to the management apparatus.

3. A system comprising a management apparatus and a plurality of terminal apparatuses, which are connected to a network, said management apparatus comprising:

generation means for generating an instruction; and transmission means for transmitting the generated instruction to one of the plurality of terminal apparatuses, and each terminal apparatus comprising:

reception means for receiving an instruction which is transmitted from the management apparatus or another terminal apparatus connected to the network;

storage means for storing identifications of instructions received in the past by said reception means;

determination means for determining whether or not an instruction newly received by said reception means is the same as any one of instructions have been already received in the past, using an identification of the newly received instruction and the identifications stored in said storage means;

installation means for, if the newly received instruction is a program install instruction and is different from each of instructions have been already received in the past, downloading a program designated by the newly received instruction from a server designated by the newly received instruction, and installing the downloaded program;

execution means for, if the newly received instruction is a program execution instruction and is different from each of instructions have been already received in the past, executing a program designated by the newly received instruction;

quitting means for, if the newly received instruction is a program execution quit instruction and is different from each of instructions have been already received in the past, quitting a program which has been executed and is designated by the received program execution quit instruction;

informing means for informing the management apparatus about the installation if said installation means installs the downloaded program, and about the execution if said execution means executes the program designated by the newly received instruction;

search means for searching for a second terminal apparatus which is connected to the network and has not received the newly received instruction; and transfer means for transferring the newly received program execution quit instruction to the second terminal apparatus, wherein if the newly received instruction includes both the program install instruction and the program execution instruction and is different from each of instructions have been already received in the past, said installation means downloads a program designated by the newly received instruction from a server designated by the newly received instruction, and installs the downloaded program, and said execution means executes the program, which is designated by the newly received instruction and is installed by said installation means.

4. A method of controlling a terminal apparatus connected to a network to which a management apparatus is connected, the method comprising:

a reception step of receiving an instruction which is transmitted from the management apparatus or another terminal apparatus connected to the network;

a storage step of storing identifications of instructions received in the past by said reception step;

a determination step of determining whether or not an instruction newly received by said reception step is the same as any one of instructions have been already received in the past, using an identification of the newly received instruction and the identifications stored in said storage step;

an installation step of, if the newly received instruction is a program install instruction and is different from each of instructions have been already received in the past, downloading a program designated by the newly received instruction from a server designated by the newly received instruction, and installing the downloaded program;

an execution step of, if the newly received instruction is a program execution instruction and is different from each of instructions have been already received in the past, executing a program designated by the newly received instruction;

a quitting step of, if the newly received instruction is a program execution quit instruction and is different from each of instructions have been already received in the past, quitting a program which has been executed and is designated by the newly received instruction;

an informing step of informing the management apparatus about the installation if said installation step installs the downloaded program, and about the execution if said execution step executes the program designated by the newly received instruction;

a search step of searching for a second terminal apparatus which is connected to the network and has not received the newly received instruction; and a transfer step of transferring the newly received instruction to the second terminal apparatus, wherein if the newly received instruction includes both the program install instruction and the program execution instruction and is different from each of instructions have been already received in the past, said installation step downloads a program designated by the newly received instruction from a server designated by the newly received instruction, and installs the downloaded program, and said execution step executes the program, which is designated by the newly received instruction and is installed by said installation step.

5. A computer-readable storage medium for storing a program for making a computer execute a control method of a terminal apparatus of claim 4.

* * * * *